(12) United States Patent
Aggarwal et al.

(10) Patent No.: US 11,178,311 B2
(45) Date of Patent: Nov. 16, 2021

(54) CONTEXT AWARE COLOR REDUCTION

(71) Applicant: ADOBE INC., San Jose, CA (US)

(72) Inventors: Vipul Aggarwal, New Delhi (IN);
Naveen Prakash Goel, Utter Pradesh (IN); Amit Gupta, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 193 days.

(21) Appl. No.: 16/547,163

(22) Filed: Aug. 21, 2019

(65) Prior Publication Data

US 2021/0058533 A1 Feb. 25, 2021

(51) Int. Cl.
*G06K 9/00* (2006.01)
*H04N 1/60* (2006.01)
*G06T 7/11* (2017.01)
*G06T 7/90* (2017.01)
*G06K 9/62* (2006.01)
*G06T 7/70* (2017.01)

(52) U.S. Cl.
CPC ......... *H04N 1/6077* (2013.01); *G06K 9/6217* (2013.01); *G06K 9/6267* (2013.01); *G06T 7/11* (2017.01); *G06T 7/70* (2017.01); *G06T 7/90* (2017.01); *G06T 2200/24* (2013.01); *G06T 2207/10048* (2013.01)

(58) Field of Classification Search
CPC . G06T 2207/30201; G06T 2207/10024; G06T 2210/41; G06T 15/04; G06T 15/06; G06T 19/20; G06T 2207/30168; G06T 2219/2012; G06T 7/0002; G06T 7/11; G06T 7/40; G06T 7/75; G06T 15/08; G06T 15/503; G06T 2200/24; G06T 5/003; G06T 5/20; G06T 5/40; G06T 7/70; G06T 7/90; G06T 11/001; G06K 9/00228; G06K 9/00234; G06K 9/00241; G06K 9/4661; G06K 9/00355; G06K 9/3233; G06K 9/00248; G06K 15/1809; G06K 15/1881; G06K 9/00261; G06K 9/342; G06K 9/4652
See application file for complete search history.

(56) References Cited

U.S. PATENT DOCUMENTS

| 2002/0076088 A1* | 6/2002 | Tsai | G06K 9/6857 382/118 |
| 2002/0080153 A1* | 6/2002 | Zhao | H04N 1/644 715/700 |
| 2009/0326381 A1* | 12/2009 | Yuan | A61B 5/415 600/473 |

(Continued)

*Primary Examiner* — Alex Kok S Liew
(74) *Attorney, Agent, or Firm* — F. Chau & Associates, LLC

(57) ABSTRACT

A method, apparatus, and non-transitory computer readable medium for color reduction based on image segmentation are described. The method, apparatus, and non-transitory computer readable medium may provide for segmenting an input image into a plurality of regions, assigning a weight to each region, identifying one or more colors for each of the regions, selecting a color palette based on the one or more colors for each of the regions and the corresponding weight for each of the regions, and performing a color reduction on the input image using the selected color palette to produce a color reduced image. The weight assigned to each region may depend on factors including relevance, prominence, focus, position, or any combination thereof.

20 Claims, 12 Drawing Sheets

(56) References Cited

U.S. PATENT DOCUMENTS

| | | | |
|---|---|---|---|
| 2010/0046830 A1* | 2/2010 | Wang | G06T 7/12 |
| | | | 382/164 |
| 2015/0006164 A1* | 1/2015 | Lu | G10L 25/00 |
| | | | 704/222 |

* cited by examiner

CONTEXT AWARE COLOR REDUCTION

BACKGROUND

The following relates generally to color reduction, and more specifically to color reduction based on image segmentation.

Color reduction is the process of reducing the number of colors present in an image to improve printing, display or file handling. Typical color reduction algorithms lead to a loss in the visual acuity of an input image a person can easily tell that the color reduction has been performed). On the other hand, manual color reduction can be costly and time consuming. Therefore, it would be desirable for an automated color reduction process that enables the creation of images that retain the visual acuity of an input image.

SUMMARY

A method, apparatus, and non-transitory computer readable medium for color reduction based on image segmentation are described. The method, apparatus, and non-transitory computer readable medium may provide for segmenting an input image into a plurality of regions, assigning a weight to each region, identifying one or more colors for each of the regions, selecting a color palette based on the one or more colors for each of the regions and the corresponding weight for each of the regions, and performing a color reduction on the input image using the selected color palette, to produce a color reduced image.

Another method, apparatus, and non-transitory computer readable medium for color reduction based on image segmentation are described. The method, apparatus, and non-transitory computer readable medium may provide for identifying one or more objects in an input image, identifying a weight for each pixel of the input image based on one or more characteristics of the objects including relevance, prominence, focus, position, or any combination thereof, calculating a weighted color contribution for each of a plurality of colors based on the identified weights, selecting a color palette based on the weighted color contribution for each of the plurality of colors, and performing a color reduction on the input image based on the selected color palette.

Another method, apparatus, and non-transitory computer readable medium for color reduction based on image segmentation are described. The method, apparatus, and non-transitory computer readable medium may provide for identifying a foreground and a background of an input image, identifying one or more objects in the foreground, classifying the one or more objects, segmenting the input image into a plurality of regions based on the one or more objects, identifying one or more object characteristics for each of the region based on the classification, normalizing the one or more characteristics, generating a weight for each of the regions by applying a linear regression model to the one or more characteristics, generating a heatmap corresponding, to a visual prominence of pixels in each of the regions, identifying a weighted color contribution for each of a plurality of candidate colors in each of the regions based on a pixel count of colors weighted by the visual prominence, identifying one or more colors for each of the regions based on the color contribution, multiplying each of the one or more colors for each of the regions by the corresponding weight for each of the regions to produce a weighted list of colors for each of the regions, merging the weighted list of colors for each of the regions to produce a combined weighted list of colors, selecting a color palette based on the weighted list, and performing a color reduction on the input image using the selected color palette.

DETAILED DESCRIPTION

Figure 1:
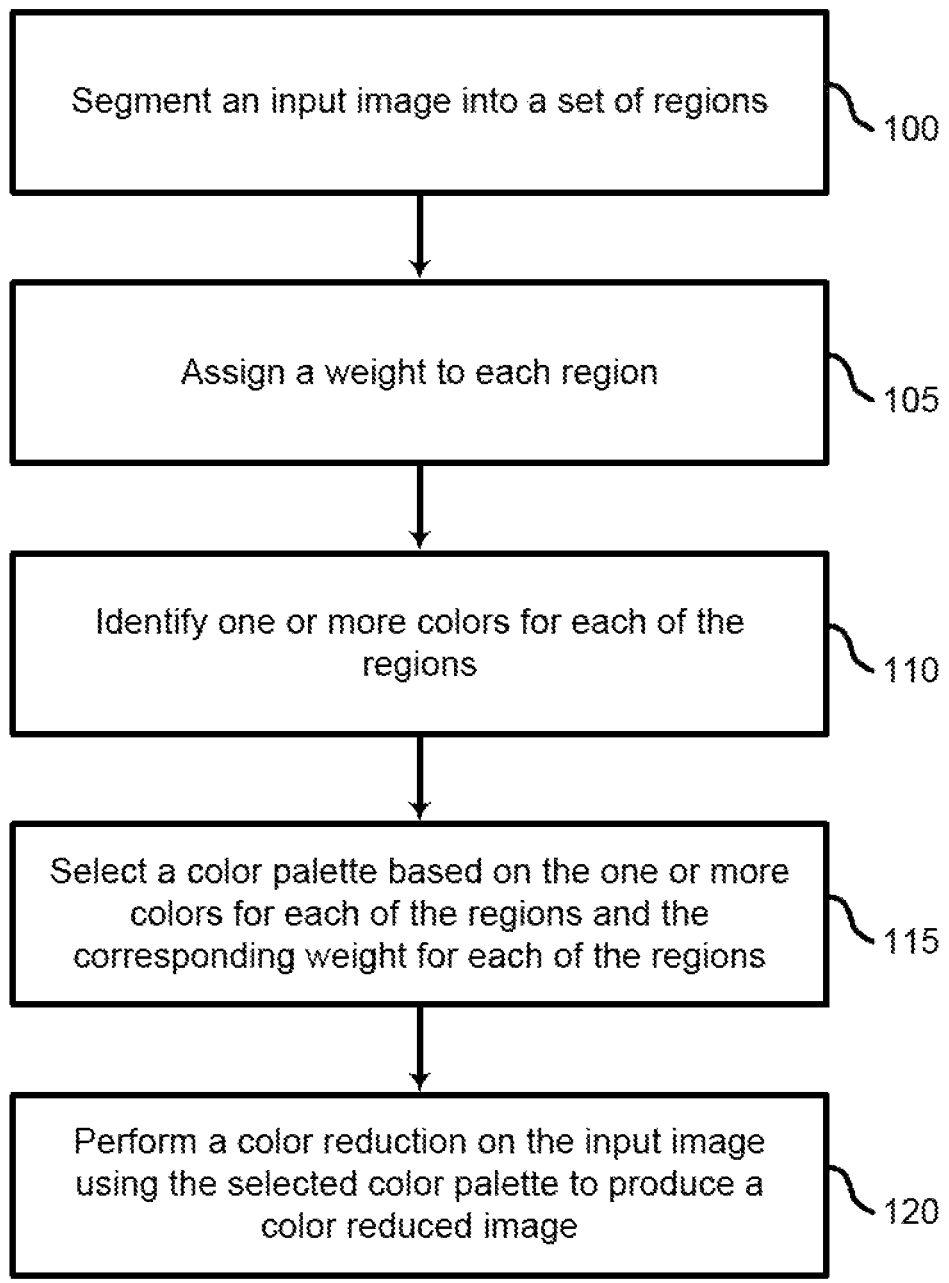
FIG. 1 shows an example of a process for color reduction based on image segmentation in accordance with aspects of the present disclosure.

In a paper printing process, inks typically overlap to produce colors representing a large gamut using a fixed set of inks, for example cyan, magenta, yellow and black (CMYK) inks. However, in textile printing inks may not overlap and only those colors are produced which are supported by a target printing device (i.e., based on the ink colors available). Thus, it is a common practice to reduce many image colors to a few colors before printing, where a target printer supports the reduced set of colors. This conversion is called color reduction. Typical color reduction algorithms work by interpolating relevance of pixels in entire image, which leads to loss in visual acuity. That is, some objects in an image may be more important to the human eye than others. Designers may manually select the colors they think are the most representative of the most important components of the image, but this process is costly and time consuming.

Existing color reduction algorithms and offerings are typically based on making color histograms from an entire image and identifying color peaks in the image. However, in certain instances insignificant colors are picked first, which results in a suboptimal color palette (e.g., the algorithm may favor background colors which are not as important as the colors in foreground objects). Thus, the output images from a typical color reduction algorithm generally demonstrates a loss in visual acuity. In other words, the output images represent the maximum color frequency in the input image, which often results in adversely affecting the primary or more significant objects or regions present in the image during manual color reduction.

Embodiments of the present disclosure provide systems and methods that solve the problems described above. In one embodiment, a five step process is used to select a color palette. In a first step (i.e., region segmentation), the input image is segmented and divided into various regions. When no significant region separation is present, the entire image can be considered as one single region. Thus, the output of this step can be one or multiple image regions. In some examples, an automatic segmentation algorithm may be used to separate foreground and background. Additionally, algorithms may be used to identify objects in the foreground and classify the identified objects.

In a second step (i.e., region ranking), each region is ranked according to its perceptual and logical relevance or importance. In some examples, the importance of a region may be determined by the content of the region and its surroundings. In other examples, (e.g., if surroundings of the region are not present) the importance of a region may be determined only by the content of the region. Region ranking can be a multi-step process. Each region can be given additive weights at each level. Weights can be assigned to the different image segments according to Relevance, Prominence, Focus and Position.

In a third step (i.e., region color selection), each identified region may be processed to select a regional set of colors (e.g., using a heatmap estimation, which can help determine the most prominent colors).

Then, in a fourth step (i.e., weighted color selection), after the color contributions from all segmented regions are identified, the color contributions can be merged into a single set according to the regional priority weights. Based on the merged list, a color palette can be selected that enables color reduction with improved visual acuity.

After the weighted color selection, color reduction may be performed using one of several methods. For example, the color reduction may be performed using a nearest color, an error diffusion, an ordered dither method, or any other suitable color reduction method that selects a color for each pixel from the selected color palette.

Thus, embodiments of the present disclosure provide an image processing method which considers the relevance of objects in an image before executing the color reduction process. In other words, the systems and methods described herein automate intelligent color selection by leveraging object level context to preserve visual acuity.

Embodiments of the present disclosure can simultaneously cater to multiple target printers by selecting a color palette based on the capabilities of those target printers. In some embodiments, the method comprises a single click automated process and does not require multiple attempts. Thus, while some embodiments may allow a user to manually set parameters until a desired result is achieved, other embodiments provide for a single pass that produces the desired result. Thus, in some embodiments, the methods disclosed herein do not require manual intervention.

FIG. 1 shows an example of a process for color reduction based on image segmentation in accordance with aspects of the present disclosure. In some examples, these operations may be performed by a system that includes a processor executing a set of codes to control functional elements (e.g., the color reduction apparatus 1200 described with reference to FIG. 12). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 100, the system segments an input image into a set of regions. In some cases, the operations of this step may be performed by a segmentation component as described with reference to FIG. 12. Embodiments of a process for segmenting the input image are further described with reference to FIGS. 2 through 4.

In some examples, segmenting the input image may include identifying a foreground and a background of the input image; identifying one or more objects in the foreground, wherein the input image is segmented based on the one or more objects; and classifying the one or more objects, wherein the weight for each of the regions is based at least in part on the classification.

At step 105, the system assigns a weight to each region. In some cases, the operations of this step may be performed by a weighting component as described with reference to FIG. 12. Embodiments of a process for assigning the weight to each region are further described with reference to FIG. 5.

In some cases, assigning the weights may include identifying one or more characteristics for each of the regions, wherein the one or more characteristics include relevance, prominence, focus, position, or any combination thereof; normalizing the one or more characteristics; and generating the weight for each of the regions by applying a linear regression model to the one or more characteristics.

At step 110, the system identifies one or more colors for each of the regions. In some cases, the operations of this step may be performed by a color selection component as described with reference to FIG. 12. Embodiments of a process for identifying colors for each region are described with reference to FIGS. 6 and 7.

In some cases, identifying the colors for each region may include generating a heatmap corresponding to a visual prominence of pixels in each of the regions; and identifying a weighted color contribution for each of a plurality of candidate colors in each of the regions based on a pixel count of colors weighted by the visual prominence, wherein the one or more colors for each of the regions are identified based on the color contribution.

At step 115, the system selects a color palette based on the one or more colors for each of the regions and the corresponding weight for each of the regions. In some cases, the operations of this step may be performed by a color selection component as described with reference to FIG. 12. Embodiments of a process for selecting the color palette are further described with reference to FIGS. 8 and 9.

In some cases, selecting the color palette may include multiplying each of the one or more colors for each of the regions by the corresponding weight assigned to each of the regions to produce a weighted list of colors for each of the regions; and merging the weighted list of colors for each of the regions to produce a combined weighted list of colors, wherein the color palette is selected based on the combined weighted list of colors.

At step 120, the system performs a color reduction on the input image using the selected color palette to produce a color reduced image. In some cases, the operations of this step may be performed by a color reduction component as described with reference to FIG. 12.

A number of methods may be used for performing color reduction, including a nearest color method, an error diffusion method, and an ordered dithering method. The nearest color method may be used by replacing the original color of each pixel of the input image with the color in the selected color palette that is closest to the original value. This method may reduce dithering and produce a high-contrast image.

The error diffusion method may also replace the original color of each pixel of the input image with the most similar color in the selected palette. However, the error diffusion method of color reduction may distribute the discrepancy between the original color and new color to the surrounding pixels. For example, as each color is replaced, the difference between the original color and the new color may be added to the next pixel before selecting the most similar color for the next pixel. The error diffusion method may be more suitable for complex graphics. Dithering patterns used with the error diffusion method may include the Floyd-Steinberg, Burkes, or Stucki algorithms.

The ordered dither method may be used by selecting colors for adjacent pixels so that the selected colors give the illusion of a third color that is close to the original color of the pixel. This method may result in an image that has the appearance of using more colors than actually exist in the color palette.

Figure 2:
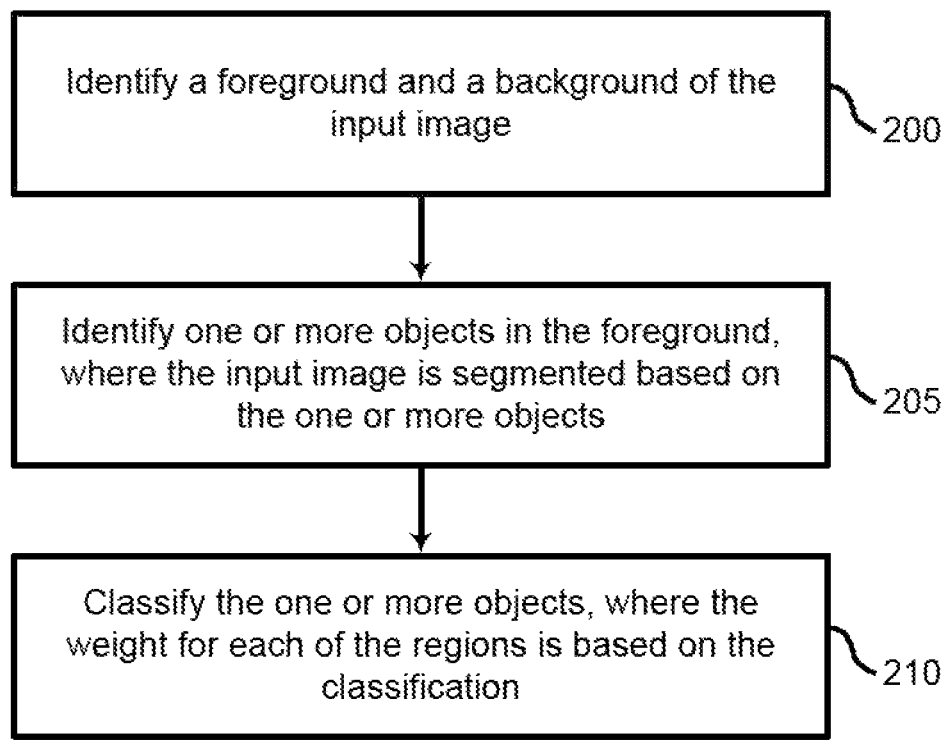
FIG. 2 shows an example of a process for segmenting an input image into a plurality of regions in accordance with aspects of the present disclosure.

FIG. 2 shows an example of a process for segmenting an input image into a plurality of regions in accordance with aspects of the present disclosure. In some examples, these operations may be performed by a system that includes a processor executing a set of codes to control functional elements (e.g., the color reduction apparatus 1200 described with reference to FIG. 12). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

In some examples, the foreground and background are identified using a foreground-background separation algorithm. In some examples, the one or more objects are identified using an object classification neural network. In some examples, the process for color reduction comprises of generating an image mask for each of the one or more regions.

At step 200, the system identifies the foreground and background of the input image. In some cases, the operations of this step may be performed by a segmentation component as described with reference to FIG. 12. To separate the foreground and background, the automatic segmentation algorithm may use one or multiple tools. The tools can include image processing tools (e.g., Adobe ClearScan®) having built-in foreground-background separation algorithms. Examples of foreground-background separation algorithms may include matting algorithms such as Knockout 2, Bayesian matting and Poisson Matting or algorithms based on a Gaussian mixture model. Other examples of systems for separating foreground and background include Lazy Snapping and GrabCut systems.

At step 205, the system identifies one or more objects in the foreground, where the input image is segmented based on the one or more objects. In some cases, the operations of this step may be performed by a segmentation component as described with reference to FIG. 12. To identify one or more objects in the foreground, the automatic segmentation algorithm may use one or multiple techniques. For example, contour detection can be used to identify various objects in the image. After contours are detected, objects in the image are extracted. Algorithms like grab-cut can be used for extracting objects.

At step 210, the system classifies the one or more objects. The weight for each of the regions is based on the classification. In some cases, the operations of this step may be performed by a segmentation component as described with reference to FIG. 12.

To classify the identified one or more objects, a classification algorithm can be executed on a segmented object image. Since deep neural networks have shown great efficiency in classifying objects in an image over a fixed set of classes, a classification neural network can be trained to classify one or more objects in segmented foreground. In some cases, a fixed set of classes can be used for this purpose.

Object detection, classification, or both may be accomplished using a convolutional neural network such as VGG16, VGG19, ResNet50, Inception V3, and Xception, or any other suitable object classification system.

Figure 3:
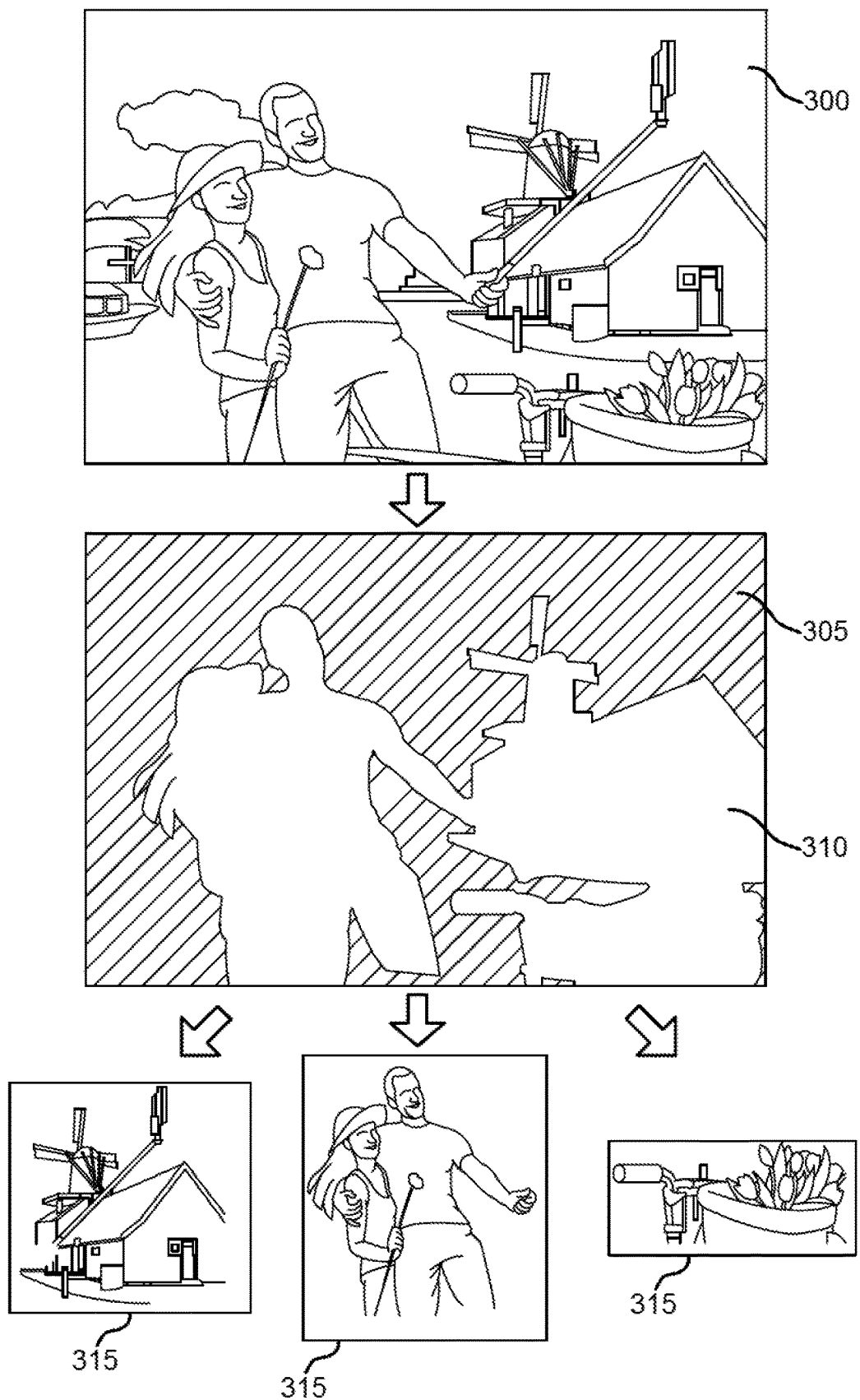
FIG. 3 shows an example of image segmentation in accordance with aspects of the present disclosure.

FIG. 3 shows an example of image segmentation in accordance with aspects of the present disclosure. The example shown includes input image 300, background 305, foreground 310, and regions 315. The input image 300 may be divided into background 305 and foreground 310, and then further divided into regions 315 (e.g., based on an image classification algorithm). In some examples, the image classification algorithm may include an artificial neural network (ANN) as described with reference to FIG. 12.

Background 305 is an example of output of step 200. In some examples, Background 305 may be a mask which separates foreground from background. In one example, background may be treated as the least important region and foreground may be treated as the more important region. In another example, foreground may be treated as the least important region and background may be treated as the more important region. The foreground and background may each comprise one or multiple objects.

Regions 315 may be an example of the output of step 205. In some examples, the regions 315 may comprise multiple distinct images (or image masks), with each individual image containing a distinct foreground object. In other examples, each of the regions 315 may be a single image containing a distinct foreground object. Regions 315 may be an example of, or include aspects of, the corresponding elements described with reference to FIG. 2.

Figure 4:
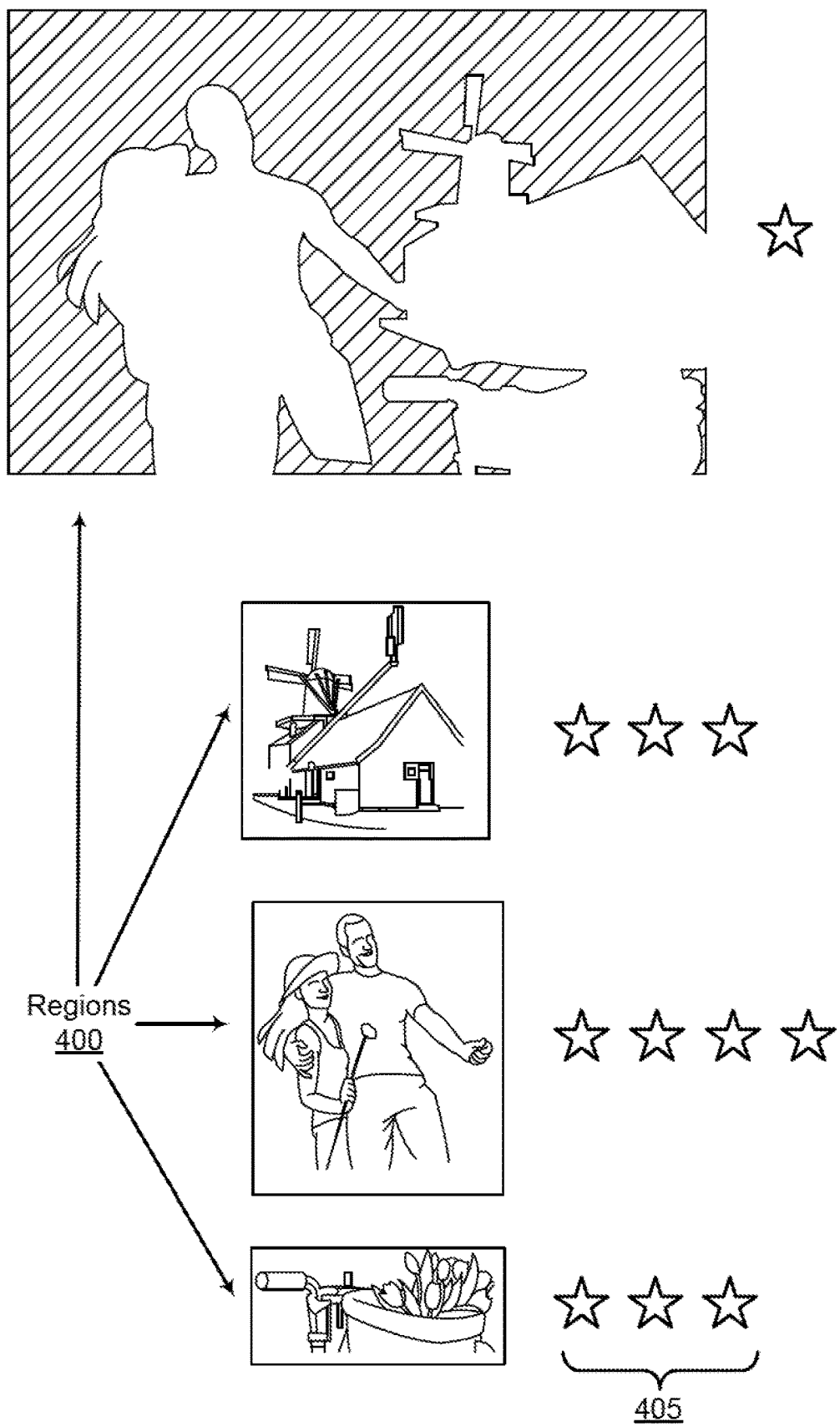
FIG. 4 shows an example of object relevance in accordance with aspects of the present disclosure.

FIG. 4 shows an example of object relevance in accordance with aspects of the present disclosure. The example shown includes regions 400 and relevance indicators 405. Each of the regions may be associated with a relevance indicator 405 that is used to weight the color contributions of colors from that region (i.e., to select the color palette for the entire image).

Regions 400 may be an example of output of step 210. In some examples, the regions 400 may be objects obtained after the classification neural network executes the input image. Object classes may be defined based on design requirements, e.g. human, animal, car, house, etc. However, the classes can also be defined based on any other desired criteria. Regions 400 may be an example of, or include aspects of, the regions 315 described with reference to FIG. 3. The relevance indicators 405 may be based on factors including the one or more characteristics include relevance, prominence, focus, position, or any combination thereof.

Figure 5:
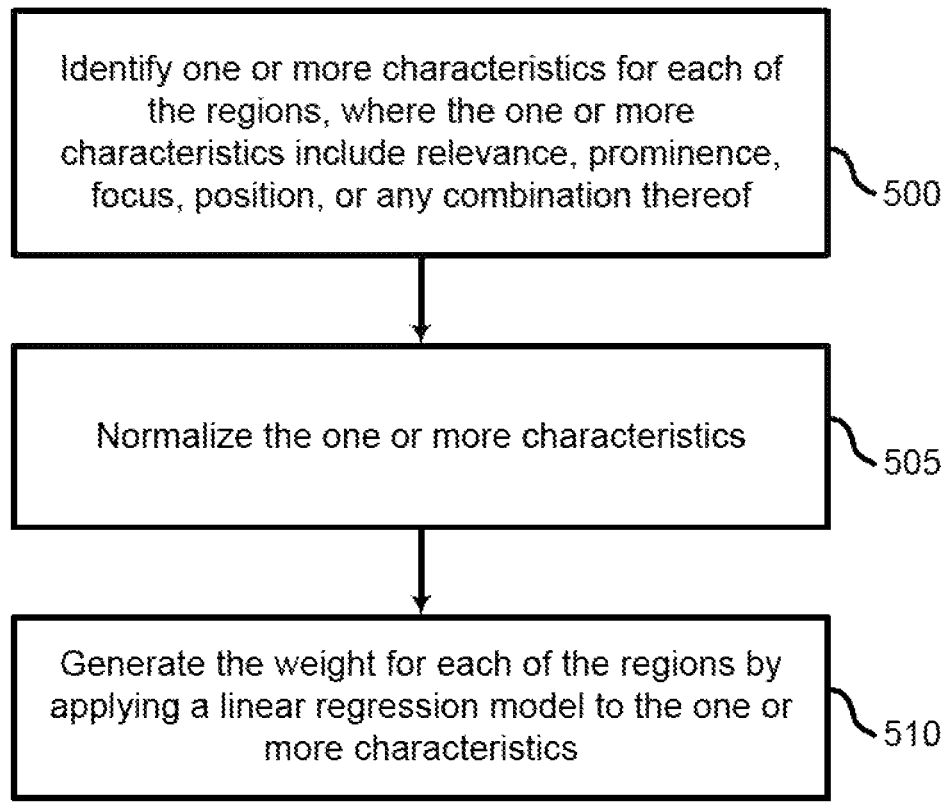
FIG. 5 shows an example of a process for assigning a weight to each region in accordance with aspects of the present disclosure.

FIG. 5 shows an example of a process for assigning a weight to each region in accordance with aspects of the present disclosure. In some examples, these operations may be performed by a system that includes a processor executing a set of codes to control functional elements (e.g., the color reduction apparatus 1200 described with reference to FIG. 12). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the system identifies one or more characteristics for each of the regions, where the one or more characteristics include relevance, prominence, focus, position, or any combination thereof. In some cases, the operations of this step may be performed by a weighting component as described with reference to FIG. 12.

The characteristic "Relevance" may be the relative importance as deduced from the class of the objects or regions. Relevance can be achieved by analyzing test data of photographic images. Relevance can be used to rank the regions. Unclassified segments can be given a default importance value. For example, a human would have a higher priority than a car. Numerically, $$\text{Relevance} = \text{Manually prefixed Priority.} \tag{1}$$

The characteristic "Prominence" may be the percentage of total pixels occupied by the image segment. Prominence may help to identify outliers of Relevance, where segments can be ranked based on a fixed pre-identified ranking system. For example, in a photoshoot of car with a human standing alongside, the relevance of human is more but its prominence value would be lesser than that of the car. Hence, this ensures that the car is given more priority in this example. Numerically, $$\text{Prominence} = \frac{\text{Number of Pixels Occupied by Region}}{\text{Total Number of Pixels in image}}. \tag{2}$$

The characteristic "Focus" may be the clarity or contrast of an image segment. In one instance, for photographic images, the main foreground objects are enabled to be kept in focus resulting in higher contrast and clarity for the most significant subjects. Rest of the objects may be out of focus and may have a certain amount of blur associated with them. The clarity factor or 'Focus' can help in identifying such in-focus image segments. Numerically, $$\text{Focus} = \frac{\text{Average luminescence of the object}}{\text{Average luminescence of the entire image}}. \tag{3}$$

The characteristic "Position" may be the spatial importance of the image segments. In one instance, for photographic images, in-focus subjects are kept symmetrical along the central X-axis or the central Y-axis of the image. The distance of the centroid of the segment from the central X-axis and the central Y-axis of the image can be computed. The weights assigned are inversely proportional to the distance from the central X-axis and central Y-axis. Numerically, $$\text{Position} = \text{Avg. dist. of centroid of region from X \& Y axis,} \tag{4}$$

where origin is at the centre of the image.

In one example, priority of the image segments can be identified using at least one of the characteristics—Relevance, Prominence, Focus, and Position. In the preferred embodiment, all the characteristics—Relevance, Prominence, Focus, and Position are used to identify the priority of the image segments.

At step 505, the system normalizes the one or more characteristics. In some cases, the operations of this step may be performed by a weighting component as described with reference to FIG. 12. In one example, feature scaling can be used to normalize the one or more characteristics.

At step 510, the system generates the weight for each of the regions by applying a linear regression model to the one or more characteristics. In some cases, the operations of this step may be performed by a weighting component as described with reference to FIG. 12. In one example, the linear regression model can include a labeled data set. The score of the region can be calculated as follows:

$$\text{Score of Region} = \text{Relevance}*W1 + \text{Prominence}*W2 + \text{locus}*W3 + \text{Position}*W4 \tag{5}$$

where W1, W2, W3, W4 are weights learned by the linear regression model.

Figure 6:
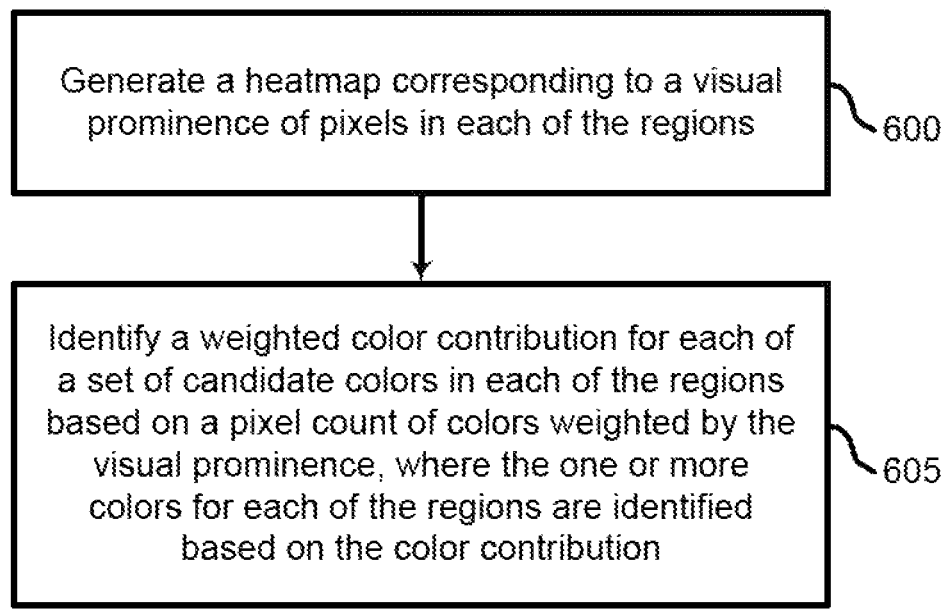
FIG. 6 shows an example of a process for identifying one or more colors for each of the regions in accordance with aspects of the present disclosure.

FIG. 6 shows an example of a process for identifying one or more colors for each of the regions in accordance with aspects of the present disclosure. In some examples, these operations may be performed by a system that includes a processor executing a set of codes to control functional elements (e.g., the color reduction apparatus 1200 described with reference to FIG. 12). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 600, the system generates a heatmap corresponding to a visual prominence of pixels in each of the regions. In some cases, the operations of this step may be performed by a color selection component as described with reference to FIG. 12.

Each identified region is processed using heatmap estimation. In some examples, the heatmap can be estimated in a way that perceptually prominent colors represent relatively higher temperature on the heatmap than the less prominent ones. For each pixel, the heatmap can provide a real number value representing the visual prominence of that pixel as follows:

$$\text{Visual Prominence of Pixel, } VP_{i,j} = k*\text{HeatMap}[i,j] \tag{6}$$

(k is a constant normalizing factor).

At step 605, the system identifies a weighted color contribution for each of a set of candidate colors in each of the regions based on a pixel count of colors weighted by the visual prominence, where the one or more colors for each of the regions are identified based on the color contribution. In some cases, the operations of this step may be performed by a color selection component as described with reference to FIG. 12. In some examples, Color Contribution is the total contribution for each color, computed using the Prominence characteristic described at step 600 as follows:

$$\text{Color Contribution, } CC[C_{i,j}] += k_1 * VP_{i,j} \forall i, j \tag{7}$$

($k_1$ is constant)

Figure 7:
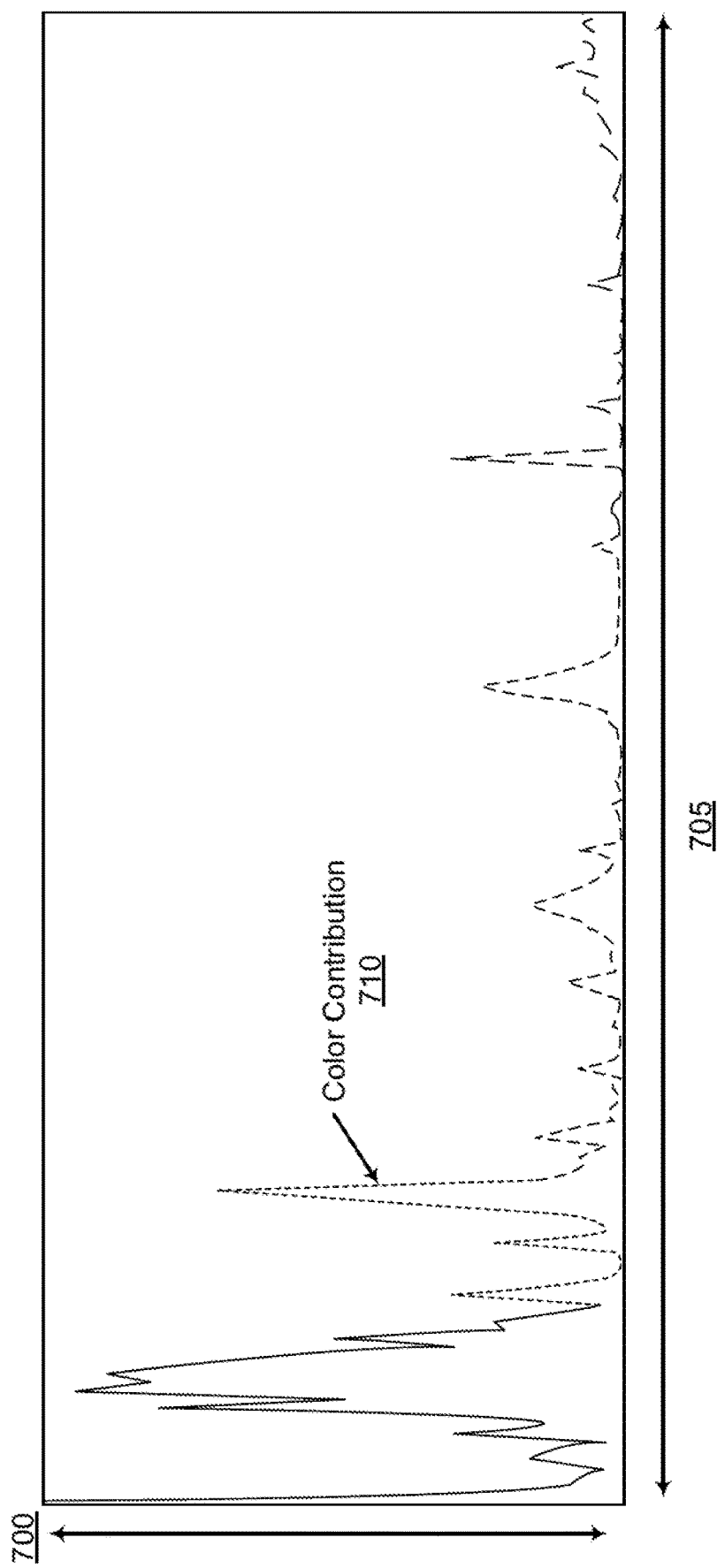
FIG. 7 shows an example of a color contribution graph in accordance with aspects of the present disclosure.

FIG. 7 shows an example of a color contribution 710 graph in accordance with aspects of the present disclosure.

The example shown includes vertical axis 700, horizontal axis 705, and color contribution 710. The vertical axis 700 represents the color contribution level, and the horizontal axis 705 represents the color frequency. Thus, the color contribution 710 line represents the color contribution level at each frequency (different colors are represented with different solid and dashed lines).

In some examples, a set of colors can be selected representing entire input image or region. Total contribution data represented in FIG. 7 shows curves similar to 'peak' and 'valley' shapes, where the peaks represent perceptually prominent colors in the image. A particular peak may be added into the selected color set if the value of the color contribution 710 for that color is above certain threshold. In some cases, a color peak with steep descent in neighborhood may get higher priority (i.e., to prevent selection of two very similar colors).

Figure 8:
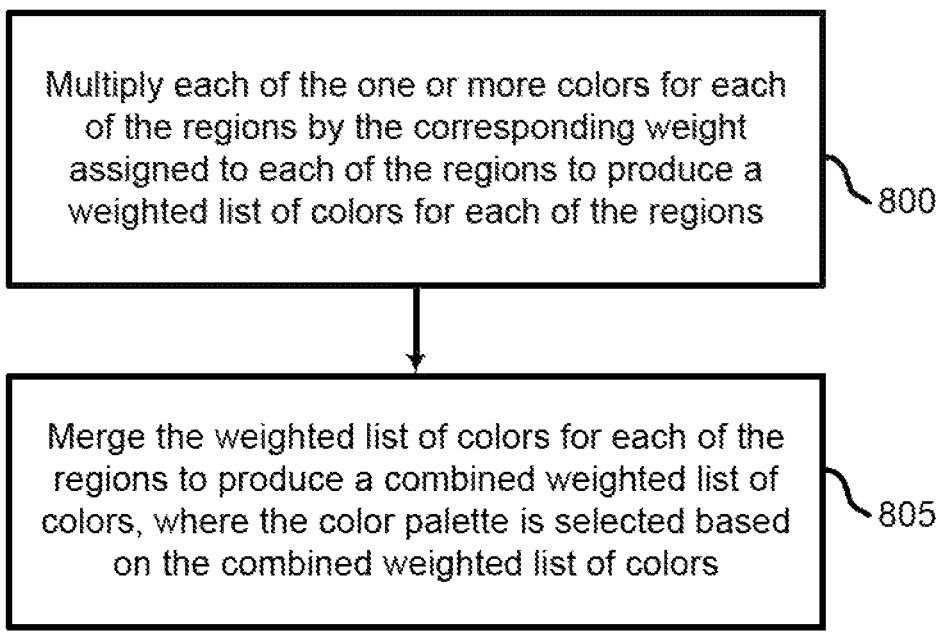
FIG. 8 shows an example of a process for selecting a color palette based on the one or more colors for each of the regions and the corresponding weight for each of the regions in accordance with aspects of the present disclosure.

FIG. 8 shows an example of a process for selecting a color palette based on the one or more colors for each of the regions and the corresponding weight for each of the regions in accordance with aspects of the present disclosure. In some examples, these operations may be performed by a system that includes a processor executing a set of codes to control functional elements (e.g., the color reduction apparatus 1200 described with reference to FIG. 12). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 800, the system multiplies each of the one or more colors for each of the regions by the corresponding weight assigned to each of the regions to produce a weighted list of colors for each of the regions. In some cases, the operations of this step may be performed by a color selection component as described with reference to FIG. 12.

At step 805, the system merges the weighted list of colors for each of the regions to produce a combined weighted list of colors, where the color palette is selected based on the combined weighted list of colors. In some cases, the operations of this step may be performed by a color selection component as described with reference to FIG. 12. After the color contributions from all segmented regions are identified, the color contributions can be merged into a single set according to their region priority weights (where $w_i$ is the weight for region w):

$$\text{Contribution Set}, CS = \sum_{i \in regions} w_i * CC_i \quad (8)$$

Figure 9:
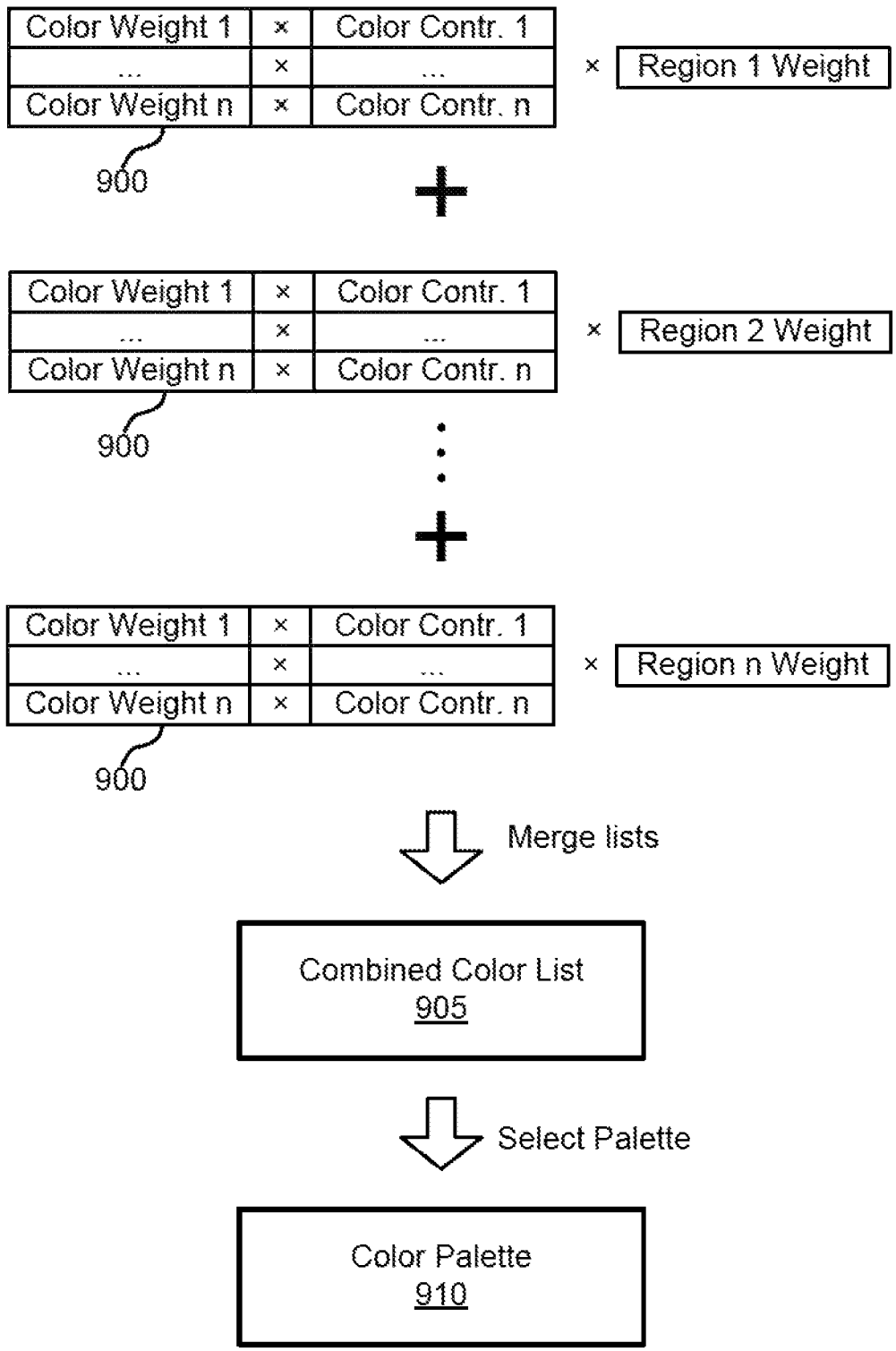
FIG. 9 shows an example of weighted color selection in accordance with aspects of the present disclosure.

FIG. 9 shows an example of weighted color selection in accordance with aspects of the present disclosure. The example shown includes regional color lists 900, combined color list 905, and color palette 910. Each of the regional color lists 900 may be weighted by a regional weighting factor and combined into combined color list 905, from which a certain number of colors may be selected to generate the color palette 910. Color reduction may be performed based on the color palette 910.

As described above, embodiments of the present disclosure include segmenting the input image into various object regions. A ranking algorithm generates respective region weights based on relevance of the regions. The region weights can decide which regions are more relevant for color reductions. Then, each region may undergo a color quantization procedure where relevance of each color is decided. Each color for the regions may be given weights according to its prominence. Thus, regional color lists 900 may be generated based on the prominence of colors in each region, and the regional color lists 900 may be multiplied by the region weights (determined by the regional relevance or importance to visual acuity).

Once the regional color lists 900 are weighted, they may be merged into combined color list 905. In some examples, the lists from one or multiple regions are merged in accordance with respective color and region weights. In other examples, the lists from all the regions are merged in accordance with respective color and region weights. In some cases, the top k colors are selected for color reduction, where k is the number of inks supported by the target printing device, to produce the color palette 910.

Figure 10:
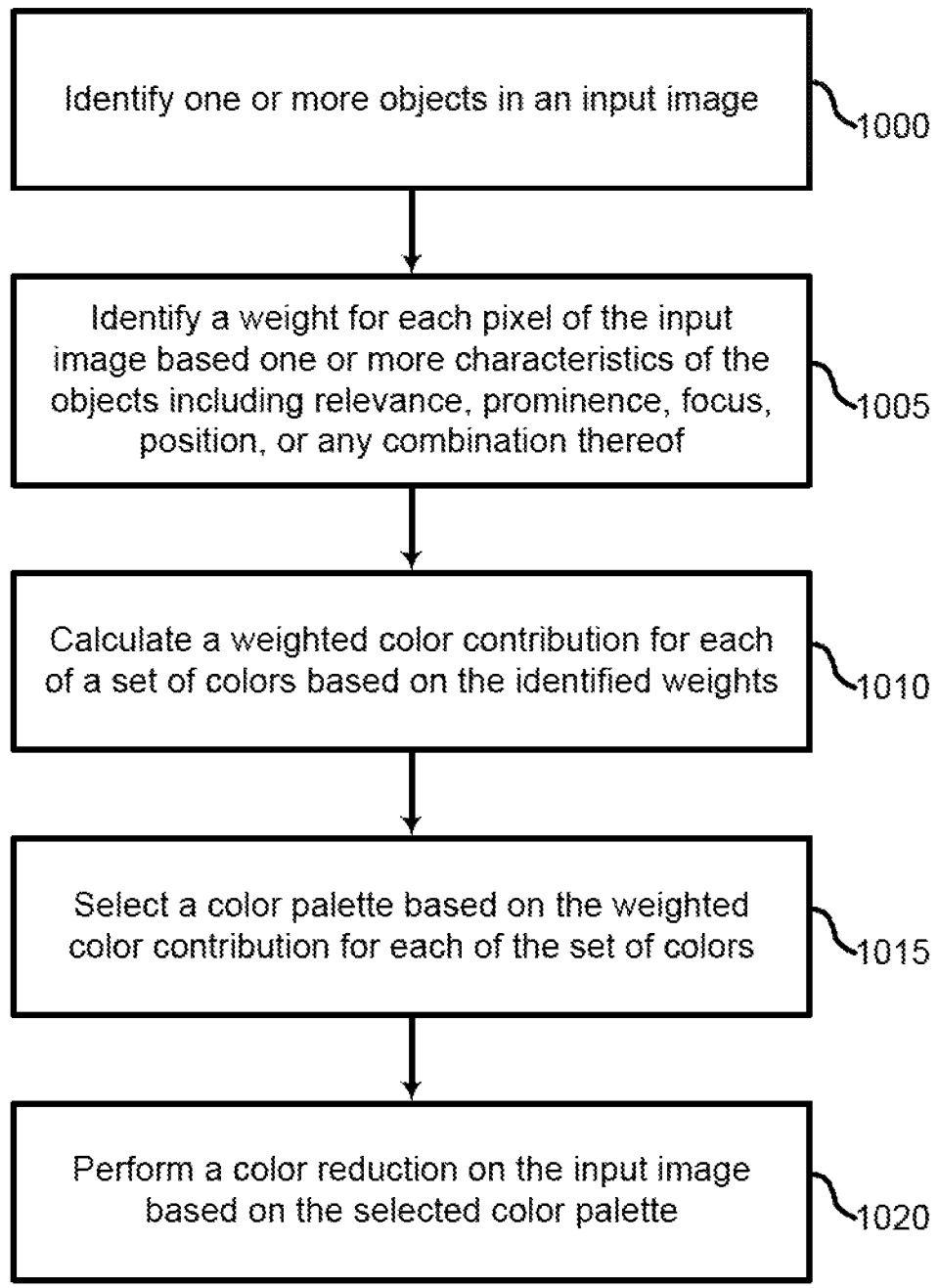
FIG. 10 shows an example of a process for color reduction based on object context in accordance with aspects of the present disclosure.

FIG. 10 shows an example of a process for color reduction based on object context in accordance with aspects of the present disclosure. In some examples, these operations may be performed by a system that includes a processor executing a set of codes to control functional elements (e.g., the color reduction apparatus 1200 described with reference to FIG. 12). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1000, the system identifies one or more objects in an input image. In some cases, the operations of this step may be performed by a segmentation component as described with reference to FIG. 12. For example, the objects may be identified using a convolutional neural network as described with reference to FIGS. 2-4.

At step 1005, the system identifies a weight for each pixel of the input image based on one or more characteristics of the objects including relevance, prominence, focus, position, or any combination thereof. In some cases, the operations of this step may be performed by a weighting component as described with reference to FIG. 12. The weights may be assigned as described with reference to FIG. 5.

At step 1010, the system calculates a weighted color contribution for each of a set of colors based on the identified weights. In some cases, the operations of this step may be performed by a color selection component as described with reference to FIG. 12. For example, the weighted color contribution may be calculated by multiplying the color contributions of individual objects by a weight assigned to each object.

At step 1015, the system selects a color palette based on the weighted color contribution for each of the set of colors. In some cases, the operations of this step may be performed by a color selection component as described with reference to FIG. 12. The color palette may be selected as described with reference to FIGS. 8 and 9.

At step 1020, the system performs a color reduction on the input image based on the selected color palette. In some cases, the operations of this step may be performed by a color reduction component as described with reference to FIG. 12.

Figure 11:
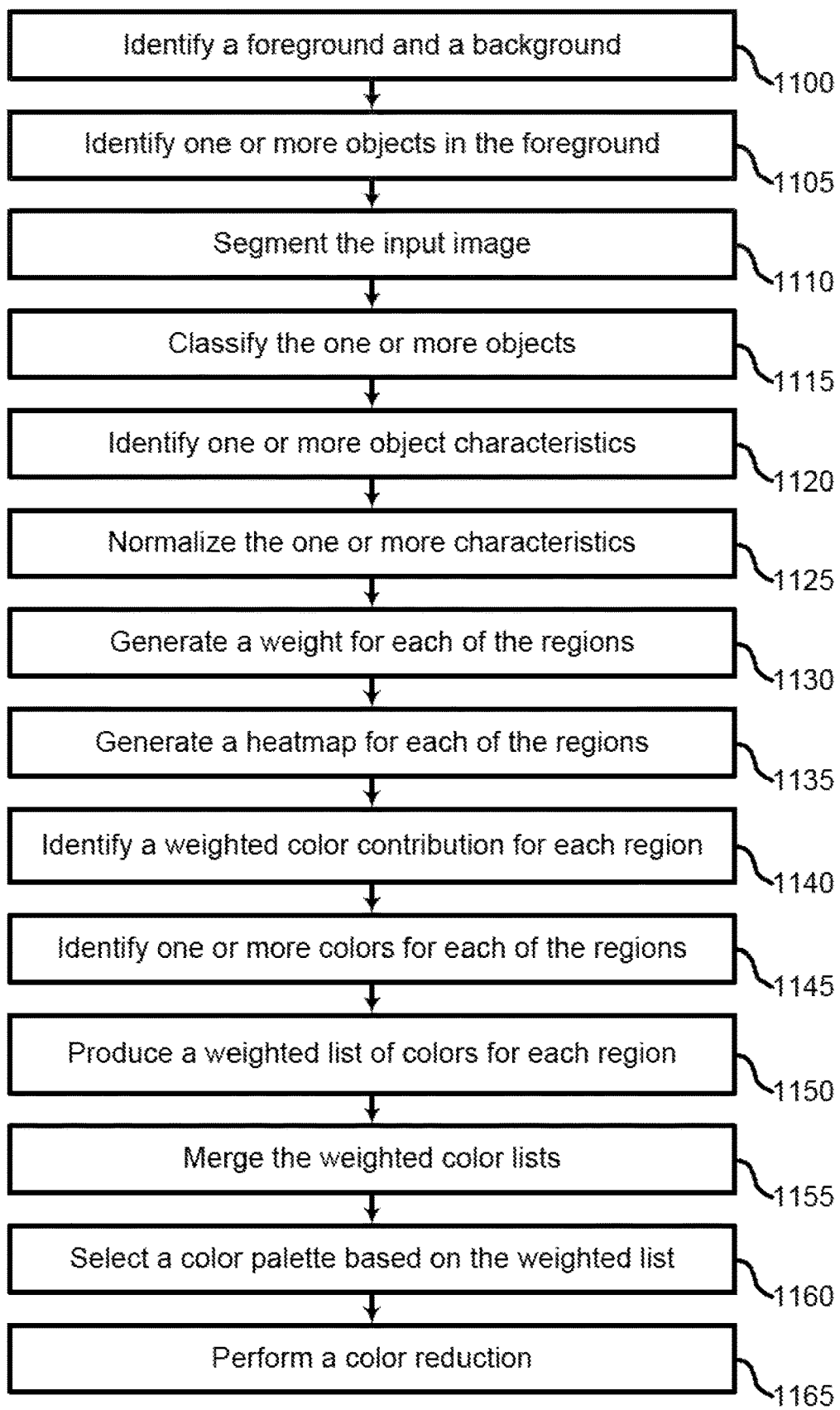
FIG. 11 shows an example of a process for color reduction based on image segmentation in accordance with aspects of the present disclosure.

FIG. 11 shows an example of a process for color reduction based on image segmentation in accordance with aspects of the present disclosure. In some examples, these operations may be performed by a system that includes a processor executing a set of codes to control functional elements (e.g., the color reduction apparatus 1200 described with reference to FIG. 12). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1100, the system identifies a foreground and a background of an input image. In some cases, the operations of this step may be performed by a segmentation component as described with reference to FIG. 12.

At step 1105, the system identifies one or more objects in the foreground. In some cases, the operations of this step may be performed by a segmentation component as described with reference to FIG. 12.

At step 1110, the system classifies the one or more objects. In some cases, the operations of this step may be performed by a segmentation component as described with reference to FIG. 12.

At step 1115, the system segments the input image into a set of regions based on the one or more objects. In some cases, the operations of this step may be performed by a segmentation component as described with reference to FIG. 12.

At step 1120, the system identifies one or more object characteristics for each of the region based on the classification. In some cases, the operations of this step may be performed by a weighting component as described with reference to FIG. 12.

At step 1125, the system normalizes the one or more characteristics. In some cases, the operations of this step may be performed by a weighting component as described with reference to FIG. 12.

At step 1130, the system generates a weight for each of the regions by applying a linear regression model to the one or more characteristics. In some cases, the operations of this step may be performed by a weighting component as described with reference to FIG. 12.

At step 1135, the system generates a heatmap corresponding to a visual prominence of pixels in each of the regions. In some cases, the operations of this step may be performed by a color selection component as described with reference to FIG. 12.

At step 1140, the system identifies a weighted color contribution for each of a set of candidate colors in each of the regions based on a pixel count of colors weighted by the visual prominence. In some cases, the operations of this step may be performed by a color selection component as described with reference to FIG. 12.

At step 1145, the system identifies one or more colors for each of the regions based on the color contribution. In some cases, the operations of this step may be performed by a color selection component as described with reference to FIG. 12.

At step 1150, the system multiplies each of the one or more colors for each of the regions by the corresponding weight for each of the regions to produce a weighted list of colors for each of the regions. In some cases, the operations of this step may be performed by a color selection component as described with reference to FIG. 12.

At step 1155, the system merges the weighted list of colors for each of the regions to produce a combined weighted list of colors. In some cases, the operations of this step may be performed by a color selection component as described with reference to FIG. 12.

At step 1160, the system selects a color palette based on the weighted list. In some cases, the operations of this step may be performed by a color selection component as described with reference to FIG. 12.

At step 1165, the system performs a color reduction on the input image using the selected color palette. In some cases, the operations of this step may be performed by a color reduction component as described with reference to FIG. 12.

Figure 12:
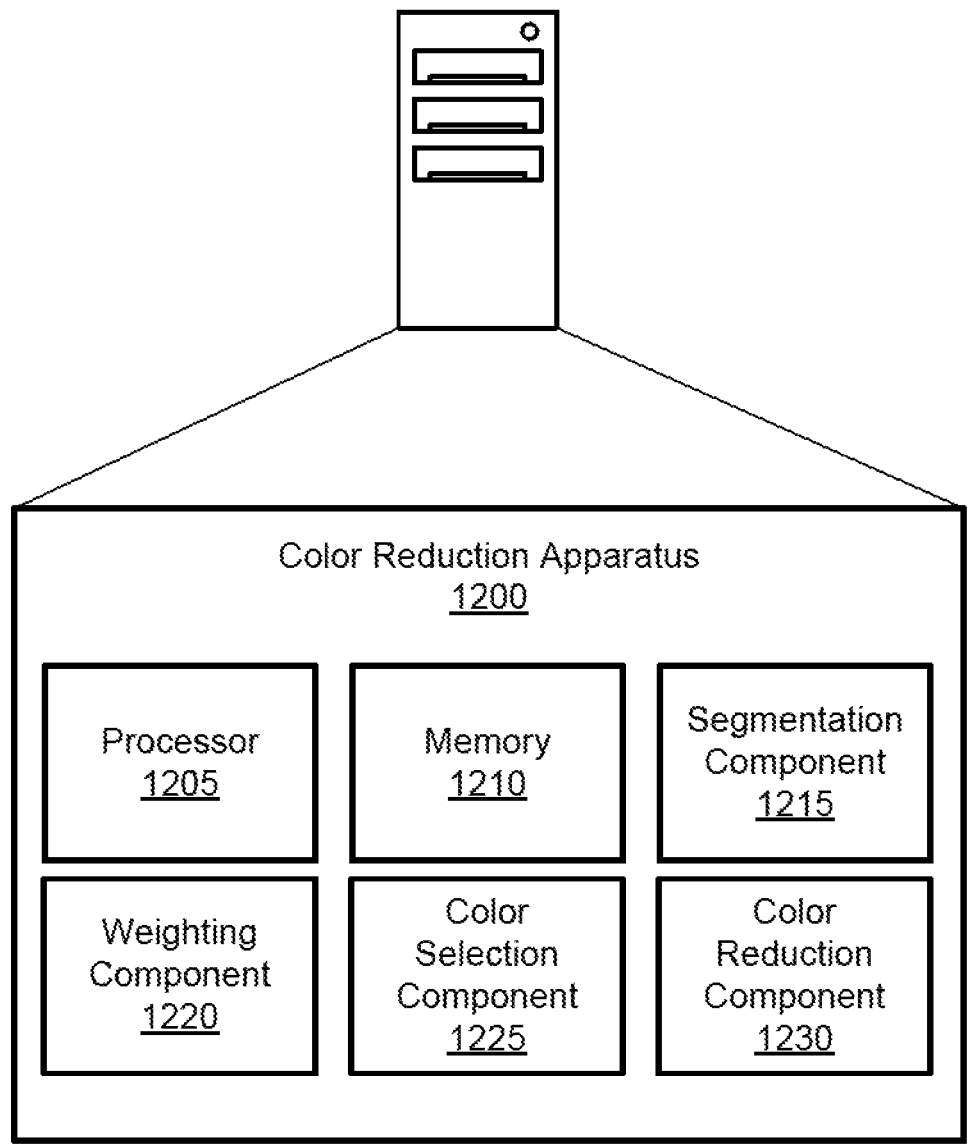
FIG. 12 shows an example of a color reduction apparatus in accordance with aspects of the present disclosure.

FIG. 12 shows an example of a color reduction apparatus 1200 in accordance with aspects of the present disclosure. Color reduction apparatus 1200 includes processor 1205, memory 1210, segmentation component 1215, weighting component 1220, color selection component 1225, and color reduction component 1230.

A processor 1205 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 1205 may be configured to operate a memory array using a memory 1210 controller. In other cases, a memory controller may be integrated into processor 1205. The processor 1205 may be configured to execute computer-readable instructions stored in a memory 1210 to perform various functions.

A computer memory 1210 may store information for various programs and applications on a computing device. For example, the storage may include data for running an operating system. The memory 1210 may include both volatile memory and non-volatile memory. Volatile memory may include random access memory (RAM), and non volatile memory may include read-only memory (ROM), flash memory, electrically erasable programmable read-only memory (EEPROM), digital tape, a hard disk drive (HDD), and a solid state drive (SSD). Memory 1210 may include any combination of readable and/or writable volatile memories and/or non-volatile memories, along with other possible storage devices.

Segmentation component 1215 segments an input image into a set of regions. Segmentation component 1215 may also identify a foreground and a background of the input image. Segmentation component 1215 may also identify one or more objects in the foreground, where the input image is segmented based on the one or more objects. Segmentation component 1215 may also classify the one or more objects, where the weight for each of the regions is based on the classification. In some examples, the foreground and background are identified using a foreground-background separation algorithm. In some examples, the one or more objects are identified using an object classification neural network. Segmentation component 1215 may also generate an image mask for each of the one or more regions.

In some examples, segmentation component may include one or more neural networks. An artificial neural network (ANN) may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

In some examples the segmentation component 1215 includes a type of ANN known as a convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Weighting component 1220 assigns a weight to each region. Weighting component 1220 may also identify one or more characteristics for each of the regions, where the one or more characteristics include relevance, prominence, focus, position, or any combination thereof. Weighting component 1220 may also normalize the one or more characteristics. Weighting component 1220 may also generate the weight for each of the regions by applying a linear regression model to the one or more Characteristics. Weighting component 1220 may identify a weight for each pixel of the input image based on the one or more characteristics.

Color selection component 1225 identifies one or more colors for each of the regions. Color selection component 1225 may also select a color palette based on the one or more colors for each of the regions and the corresponding weight for each of the regions. Color selection component 1225 may also generate a heatmap corresponding to a visual prominence of pixels in each of the regions. Color selection component 1225 may also identify a weighted color contribution for each of a set of candidate colors in each of the regions based on a pixel count of colors weighted by the visual prominence, where the one or more colors for each of the regions are identified based on the color contribution. In some examples, the one or more colors for each of the regions are identified based on whether the weighted color contribution for each of the candidate colors is above a threshold value.

Color selection component 1225 multiplies each of the one or more colors for each of the regions by the corresponding weight assigned to each of the regions to produce a weighted list of colors for each of the regions. Color selection component 1225 may also merge the weighted list of colors for each of the regions to produce a combined weighted list of colors, where the color palette is selected based on the combined weighted list of colors. Color selection component 1225 may also identify a perceptual contribution of the one or more colors for each of the regions, where the color palette is selected based on the perceptual contribution of the one or more colors for each of the regions. Thus, color selection component 1225 may calculate a weighted color contribution for each of a set of colors based on the identified weights, and select a color palette based on the weighted color contributions.

Color reduction component 1230 performs a color reduction on the input image using the selected color palette to produce a color reduced image. In some cases, the color reduction is based on a single-click input of the user. That is, some embodiments of the present disclosure enable the user to simply initiate a color reduction function without manually selecting colors or parameters for the reduction. In some cases, the simplified, single-click interface is based on the user identifying an image to perform the color reduction on, and then initiating the color reduction process described herein without further input from the user.

Accordingly, the present disclosure includes the following embodiments.

A method for color reduction based on image segmentation is described. The method may include segmenting an input image into a plurality of regions, assigning a weight to each region, identifying one or more colors for each of the regions, selecting a color palette based on the one or more colors for each of the regions and the corresponding weight for each of the regions, and performing a color reduction on the input image using the selected color palette to produce a color reduced image.

An apparatus for color reduction is described. The apparatus may include a processor, memory in electronic communication with the processor, and instructions stored in the memory. The instructions may be operable to cause the processor to segment an input image into a plurality of regions, assign a weight to each region, identify one or more colors for each of the regions, select a color palette based on the one or more colors for each of the regions and the corresponding weight for each of the regions, and perform a color reduction on the input image using the selected color palette to produce a color reduced image.

A non-transitory computer readable medium storing code for color reduction is described. In some examples, the code comprises instructions executable by a processor to: segment an input image into a plurality of regions, assign a weight to each region, identify one or more colors for each of the regions, select a color palette based on the one or more colors for each of the regions and the corresponding weight for each of the regions, and perform a color reduction on the input image using the selected color palette to produce a color reduced image.

Some examples of the method, apparatus, and non-transitory computer readable medium described above may further include identifying a foreground and a background of the input image. Some examples may further include identifying one or more objects in the foreground, wherein the input image is segmented based on the one or more objects. Some examples may further include classifying the one or more objects, wherein the weight for each of the regions is based at least in part on the classification.

In some examples, the foreground and background are identified using a foreground-background separation algorithm. In some examples, the one or more objects are identified using an object classification neural network. Some examples of the method, apparatus, and non-transitory computer readable medium described above may further include generating an image mask for each of the one or more regions.

Some examples of the method, apparatus, and non-transitory computer readable medium described above may further include identifying one or more characteristics for each of the regions, wherein the one or more characteristics include relevance, prominence, focus, position, or any combination thereof. Some examples may further include normalizing the one or more characteristics. Some examples may further include generating the weight for each of the regions by applying a linear regression model to the one or more characteristics.

Some examples of the method, apparatus, and non-transitory computer readable medium described above may further include generating a heatmap corresponding to a visual prominence of pixels in each of the regions. Some examples may further include identifying a weighted color contribution for each of a plurality of candidate colors in each of the regions based on a pixel count of colors weighted by the visual prominence, wherein the one or more colors for each of the regions are identified based on the color contribution. In some examples, the one or more colors for each of the regions are identified based on whether the weighted color contribution for each of the candidate colors is above a threshold value.

Some examples of the method, apparatus, and non-transitory computer readable medium described above may further include multiplying each of the one or more colors for each of the regions by the corresponding weight assigned to each of the regions to produce a weighted list of colors for each of the regions. Some examples may further include merging the weighted list of colors for each of the regions to produce a combined weighted list of colors, wherein the color palette is selected based on the combined weighted list of colors.

Some examples of the method, apparatus, and non-transitory computer readable medium described above may further include identifying a perceptual contribution of the one or more colors for each of the regions, wherein the color palette is selected based at least in part on the perceptual contribution of the one or more colors for each of the regions.

A method for color reduction based on image segmentation is described. The method may include identifying one or more objects in an input image, identifying a weight for each pixel of the input image based on one or more characteristics of the objects including relevance, prominence, focus, position, or any combination thereof, calculating a weighted color contribution for each of a plurality of colors based on the identified weights, selecting a color palette based on the weighted color contribution for each of the plurality of colors, and performing a color reduction on the input image based on the selected color palette.

An apparatus for color reduction is described. The apparatus may include a processor, memory in electronic communication with the processor, and instructions stored in the memory. The instructions may be operable to cause the processor to identify one or more objects in an input image, identify a weight for each pixel of the input image based on one or more characteristics of the objects including relevance, prominence, focus, position, or any combination thereof, calculate a weighted color contribution for each of a plurality of colors based on the identified weights, select a color palette based on the weighted color contribution for each of the plurality of colors, and perform a color reduction on the input image based on the selected color palette.

A non-transitory computer readable medium storing code for color reduction is described. In some examples, the code comprises instructions executable by a processor to: identify one or more objects in an input image, identify a weight for each pixel of the input image based on one or more characteristics of the objects including relevance, prominence, focus, position, or any combination thereof, calculate a weighted color contribution for each of a plurality of colors based on the identified weights, select a color palette based on the weighted color contribution for each of the plurality of colors, and perform a color reduction on the input image based on the selected color palette.

A method for color reduction based on image segmentation is described. The method may include identifying a foreground and a background of an input image, identifying one or more objects in the foreground, classifying the one or more objects, segmenting the input image into a plurality of regions based on the one or more objects, identifying one or more object characteristics for each of the region based on the classification, normalizing the one or more characteristics, generating a weight for each of the regions by applying a linear regression model to the one or more characteristics, generating a heatmap corresponding to a visual prominence of pixels in each of the regions, identifying a weighted color contribution for each of a plurality of candidate colors in each of the regions based on a pixel count of colors weighted by the visual prominence, identifying one or more colors for each of the regions based on the color contribution, multiplying each of the one or more colors for each of the regions by the corresponding weight for each of the regions to produce a weighted list of colors for each of the regions, merging the weighted list of colors for each of the regions to produce a combined weighted list of colors, selecting a color palette based on the weighted list, and performing a color reduction on the input image using the selected color palette.

An apparatus for color reduction is described. The apparatus may include a processor, memory in electronic communication with the processor, and instructions stored in the memory. The instructions may be operable to cause the processor to identify a foreground and a background of an input image, identify one or more objects in the foreground, classify the one or more objects, segment the input image into a plurality of regions based on the one or more objects, identify one or more object characteristics for each of the region based on the classification, normalize the one or more characteristics, generate a weight for each of the regions by applying a linear regression model to the one or more characteristics, generate a heatmap corresponding to a visual prominence of pixels in each of the regions, identify a weighted color contribution for each of a plurality of candidate colors in each of the regions based on a pixel count of colors weighted by the visual prominence, identify one or more colors for each of the regions based on the color contribution, multiply each of the one or more colors for each of the regions by the corresponding weight for each of the regions to produce a weighted list of colors for each of the regions, merge the weighted list of colors for each of the regions to produce a combined weighted list of colors, select a color palette based on the weighted list, and perform a color reduction on the input image using the selected color palette.

A non-transitory computer readable medium storing code for color reduction is described. In some examples, the code comprises instructions executable by a processor to: identify a foreground and a background of an input image, identify one or more objects in the foreground, classify the one or more objects, segment the input image into a plurality of regions based on the one or more objects, identify one or more object characteristics for each of the region based on the classification, normalize the one or more characteristics, generate a weight for each of the regions by applying a linear regression model to the one or more characteristics, generate a heatmap corresponding to a visual prominence of pixels in each of the regions, identify a weighted color contribution for each of a plurality of candidate colors in each of the regions based on a pixel count of colors weighted by the visual prominence, identify one or more colors for each of the regions based on the color contribution, multiply each of the one or more colors for each of the regions by the corresponding weight for each of the regions to produce a weighted list of colors for each of the regions, merge the weighted list of colors for each of the regions to produce a combined weighted list of colors, select a color palette based on the weighted list, and perform a color reduction on the input image using the selected color palette.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof, if implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for color reduction, comprising:
   segmenting an input image into a plurality of regions including a foreground region;
   identifying a class of an object in the foreground region;
   assigning a weight to each region, wherein the weight for the foreground region is based on the class of the object;
   identifying one or more colors for each of the regions;
   selecting a color palette based on the one or more colors for each of the regions and the corresponding weight for each of the regions; and
   performing a color reduction on the input image using the selected color palette to produce a color reduced image.

2. The method of claim 1, further comprising:
   identifying a background region of the input image;
   identifying one or more objects in the foreground region, wherein the input image is segmented based on the one or more objects; and
   classifying the one or more objects, wherein the weight for each of the regions is based at least in part on the classification.

3. The method of claim 2, wherein:
   the foreground region and the background region are identified using a foreground-background separation algorithm.

4. The method of claim 2, wherein:
   the one or more objects are identified using an object classification neural network.

5. The method of claim 1, further comprising:
   generating an image mask for each of the regions.

6. The method of claim 1, further comprising:
   identifying one or more characteristics for each of the regions, wherein the one or more characteristics include relevance, prominence, focus, position, or any combination thereof;
   normalizing the one or more characteristics; and
   generating the weight for each of the regions by applying a linear regression model to the one or more characteristics.

7. The method of claim 1, further comprising:
   generating a heatmap comprising a visual prominence value for each pixel in the input image; and
   identifying a weighted color contribution for each of a plurality of candidate colors in each of the regions based on a pixel count of colors weighted by the visual prominence value, wherein the one or more colors for each of the regions are identified based on the color contribution.

8. The method of claim 7, wherein:
the one or more colors for each of the regions are identified based on whether the weighted color contribution for each of the candidate colors is above a threshold value.

9. The method of claim 1, further comprising:
multiplying each of the one or more colors for each of the regions by the corresponding weight assigned to each of the regions to produce a weighted list of colors for each of the regions; and
merging the weighted list of colors for each of the regions to produce a combined weighted list of colors, wherein the color palette is selected based on the combined weighted list of colors.

10. The method of claim 1, further comprising:
identifying a perceptual contribution of the one or more colors for each of the regions, wherein the color palette is selected based at least in part on the perceptual contribution of the one or more colors for each of the regions.

11. The method of claim 1, wherein:
the color reduction is performed based on a single-click input from a user.

12. A method for color reduction, comprising:
identifying one or more objects in an input image;
segmenting the input image into a plurality of regions including a foreground region;
identifying a focus characteristic based on a clarity or contrast of an image segment in the input image;
identifying a weight for each pixel of the input image based on the focus characteristic;
calculating a weighted color contribution for each of a plurality of colors based on the identified weights;
selecting a color palette based on the weighted color contribution for each of the plurality of colors; and
performing a color reduction on the input image based on the selected color palette.

13. The method of claim 12, further comprising:
identifying the foreground region and a background region of the input image;
identifying the one or more objects in the foreground region, wherein the input image is segmented based on the one or more objects; and
classifying the one or more objects.

14. The method of claim 13, wherein:
the foreground region and the background region are identified using a foreground-background separation algorithm.

15. The method of claim 12, further comprising:
generating an image mask.

16. The method of claim 12, further comprising:
identifying one or more characteristics for each of the objects, wherein the one or more characteristics include relevance, prominence, focus, position, or any combination thereof;
normalizing the one or more characteristics; and
applying a linear regression model to the one or more characteristics.

17. The method of claim 12, further comprising:
generating a heatmap comprising a visual prominence value for each pixel in the input image; and
identifying the weighted color contribution for each of a plurality of colors based on a pixel count of colors weighted by the visual prominence value.

18. The method of claim 12, further comprising:
multiplying one or more colors by a corresponding weight; and
merging a weighted list of colors for each of the objects.

19. The method of claim 12, further comprising:
identifying a perceptual contribution of one or more colors for each of the objects.

20. A method for color reduction, comprising:
identifying a foreground and a background of an input image;
identifying one or more objects in the foreground;
classifying the one or more objects;
segmenting the input image into a plurality of regions based on the one or more objects;
identifying one or more object characteristics for each of the regions based on the classification;
normalizing the one or more characteristics;
generating a weight for each of the regions by applying a linear regression model to the one or more characteristics;
generating a heatmap corresponding to a visual prominence of pixels in each of the regions;
identifying a weighted color contribution for each of a plurality of candidate colors in each of the regions based on a pixel count of colors weighted by the visual prominence;
identifying one or more colors for each of the regions based on the color contribution;
multiplying each of the one or more colors for each of the regions by the corresponding weight for each of the regions to produce a weighted list of colors for each of the regions;
merging the weighted list of colors for each of the regions to produce a combined weighted list of colors;
selecting a color palette based on the combined weighted list; and
performing a color reduction on the input image using the selected color palette.

* * * * *